United States Patent [19]

Motojima et al.

[11] 4,448,711
[45] May 15, 1984

[54] PROCESS FOR PRODUCING ZEOLITE ADSORBENT AND PROCESS FOR TREATING RADIOACTIVE LIQUID WASTE WITH THE ZEOLITE ADSORBENT

[75] Inventors: Kenji Motojima, Mito; Fumio Kawamura, Hitachi, both of Japan

[73] Assignee: Hitachi, Ltd., Tokyo, Japan

[21] Appl. No.: 213,005

[22] Filed: Dec. 4, 1980

[30] Foreign Application Priority Data

Dec. 6, 1979 [JP] Japan .................................. 54-158302
Feb. 8, 1980 [JP] Japan .................................. 55-13646

[51] Int. Cl.³ ............................................. B01J 27/24
[52] U.S. Cl. ..................................... 502/74; 210/682; 210/684; 210/679; 210/502; 252/631; 423/6; 502/200
[58] Field of Search ............... 210/502, 684, 679, 682; 423/6; 252/626, 628, 629, 631, 438, 455 Z

[56] References Cited

U.S. PATENT DOCUMENTS 3,196,106 7/1965 Haden .................................. 252/628
3,453,214 7/1969 Bonnin .................................. 210/682

Primary Examiner—Sam Silverberg
Attorney, Agent, or Firm—Antonelli, Terry & Wands

[57] ABSTRACT

Zeolite is contacted with an aqueous solution containing at least one of copper, nickel, cobalt, manganese and zinc salts, preferably copper and nickel salts, particularly preferably copper salt, in such a form as sulfate, nitrate, or chloride, thereby adsorbing the metal on the zeolite in its pores by ion exchange, then the zeolite is treated with a water-soluble ferrocyanide compound, for example, potassium ferrocyanide, thereby forming metal ferrocyanide on the zeolite in its pores. Then, the zeolite is subjected to ageing treatment, thereby producing a zeolite adsorbent impregnated with metal ferrocyanide in the pores of zeolite. The adsorbent can selectively recover cesium with a high percent cesium removal from a radioactive liquid waste containing at least radioactive cesium, for example, a radioactive liquid waste containing cesium and such coexisting ions as sodium, magnesium, calcium and carbonate ions at the same time at a high concentration. The zeolite adsorbent has a stable adsorbability for a prolonged time.

8 Claims, 5 Drawing Figures

FIG. 3

| Na₂SO₄ CONC | 15 wt % |
|---|---|
| Cs CONC. | 40 ppm |
| pH | 7.0 |
| SOLUTION FLOW RATE | 4 ml/min |
| DURATION | 250 min |

| $Cs^+ - M^{n+}$ *** | PERCENT Cs REMOVAL (%) 0  50  100 | $M^{n+}$***/$Cs^+$ |
|---|---|---|
| $Cs^+$ ONLY | ▨ (100) | 0 |
| $Cs^+ - Ca^{2+}$ * | ▨ (100) | 25.0 |
| $Cs^+ - Mg^{2+}$ * | ▨ (100) | 25.0 |
| $Cs^+ - CO_3^{2-}$ ** | ▨ (100) | 25.0 |
| $Cs^+ - NH_4^+$ | ▨ | 12.9 |

\* : PRESENT AS SCALES OR INHIBITORS IN WASTE SOLUTION

\*\* : PRESENT OWING TO $CO_2$ GAS BEING ABSORBED FROM AIR

\*\*\* : $M^{n+}$ : COEXISTING ION SPECIES

*: COPPER FERROCYANIDE-IMPREGNATED ZEOLITE
**: COPPER FERROCYANIDE-IMPREGNATED ANION EXCHANGE RESIN

PROCESS FOR PRODUCING ZEOLITE ADSORBENT AND PROCESS FOR TREATING RADIOACTIVE LIQUID WASTE WITH THE ZEOLITE ADSORBENT

BACKGROUND OF THE INVENTION

This invention relates to a process for producing a zeolite adsorbent with a metal ferrocyanide for separating and concentrating cesium from a radioactive liquid waste, etc., and also to a process for treating a radioactive liquid waste, particularly a liquid waste containing radioactive cesium generated from radioactive material-handling facilities.

Treatment of radioactive liquid waste is always a problem in the field of developing and utilizing atomic energy.

Radioactive cesium is produced in a large amount by nuclear fission reaction of uranium-235, etc. For example, the radioactive cesium produced by nuclear fission includes, for example, cesium-137 (nuclear fission yield: 6.2%; half life: 30 years), cesium-135 (nuclear fission yield: 6.4%; half life: $3 \times 16^6$ years), cesium-133 (nuclear fission yield 6.6%; stable) and cesium-134 (half life: 2.3 years) produced by radioactivation of cesium-133 by neutrons. The radioactive cesium has a long half life and is an alkali metal, and thus is dissolved in cooling water for nuclear reactor. Accordingly, a liquid waste from regeneration of a condensate demineralizer of nuclear reactor contains the radioactive cesium. Also, a liquid waste from a nuclear fuel reprocessing plant contains the radioactive cesium. That is, various liquid wastes from nuclear reactors and related facilities contain the radioactive cesium, and thus it is very important to remove the radioactive cesium in the treatment of the liquid wastes.

Well known processes for removing the radioactive cesium from radioactive liquid waste generated from the radioactive material-handling facilities such as nuclear power plant, etc. include an evaporation-separation process for treating liquid wastes in an evaporator, a process for ion exchange adsorption with ion exchange resin or inorganic ion exchanger, for example, zeolite [M. Horioka: Nippon Genshiryoku Gakkai-shi 11 10 (1969)], a process for coprecipitation with nickel ferrocyanide [N. Furuya: Technical Report of Kyoto University Nuclear Reactor Laboratory KURRI-Th-73 (1970)], and a process for cesium removal with copper ferrocyanide-impregnated anion exchange resin, i.e. ion exchange resin with improved adsorption characteristics [Journal of Nuclear Science and Technology 4 (4) 190–194 (April, 1967)]. Also, it has been reported that sparingly water-soluble ferrocyanides have such a characteristic as to take cesium ions into the crystal lattice of the ferrocyanide [Barton, etc: Ind. Eng. Chem. 50 212 (1958)].

However, the evaporation-separation process cannot attain a high percent cesium removal due to mist entrainment, and the coprecipitation process is so complicated in operation that a high percent cesium removal is very hard to obtain by one treatment.

The cesium removal with ion exchange resin or inorganic ion exchanger has a high percent cesium removal from a simple laboratory test solution, that is, an aqueous solution containing no other metal ions or cations than cesium ions, but the actual radioactive liquid waste generated from the nuclear material-handling facilities contains other coexisting metal ions and cations than cesium ions, particularly a relatively large amount of sodium ions, as shown in Table 1, and the cesium adsorption is so inhibited by these coexisting metal ions that it is hard to obtain a high percent cesium removal. Ion exchange resin is also poor in heat resistance, acid resistance and alkali resistance. Any of these well known processes has problems.

TABLE 1

| Nuclear material-handling facilities | | Main component | Concentration (% by weight) |
|---|---|---|---|
| Nuclear power plant based on light water nuclear reactor | Boiling water type nuclear reactor (BWR) | $Na_2SO_4$ | 15–25 |
| | Pressurized water type nuclear reactor (PWR) | $Na_2B_4O_7$ | 2–5 |
| Nuclear fuel-reprocessing plant | | $NaNO_3$ | 20–50 |

SUMMARY OF THE INVENTION

To solve the above-mentioned problems, the present inventors have taken metal ferrocyanide compounds and zeolite, and have made studies of producing a novel cesium adsorbent capable of removing cesium from a radioactive liquid waste containing cesium ions and other coexisting metal ions with a high percent cesium removal.

Zeolite impregnated with specific metals through ion exchange has distinguished properties as a molecular sieve or a catalyst, and is widely utilized in various fields. For example, type A zeolite with ion-exchanged potassium or calcium has a pore diameter of 5 Å or 3 Å, respectively, and is used as a selective adsorbent for gas. Zeolite with ion-exchanged calcium, manganese, or rare earth metals is used as a catalytic cracking catalyst for petroleum, and zeolites impregnated with a few percent of copper, nickel, platinum, etc. are utilized in the petrochemical industry as characteristic reaction catalysts. Furthermore, zeolite impregnated with a large amount of silver is utilized as a demineralizer for sea water, or as an adsorbent for radioactive iodine which might be discharged from the radioactive material-handling facilities. These kinds of zeolite impregnated with the metals can be produced according to the ordinary ion exchange process without requiring any special or complicated operation or procedure.

However, the present inventors have found that in impregnation of the zeolite with a metal ferrocyanide compound in the pores of zeolite according to the ordinary ion exchange process, the metal ferrocyanide compound is soon released from the impregnated zeolite, and cannot be supported on the zeolite stably for a prolonged period of time, and a special procedure has been required for supporting the metal ferrocyanide compound on the zeolite stably for a prolonged period of time, and further have found that the zeolite adsorbent prepared according to the special procedure can recover cesium ions with a high percent cesium removal particularly from a radioactive liquid waste containing cesium and a large amount of other coexisting metal ions.

An object of the present invention is to provide a process for producing a zeolite adsorbent impregnated with a metal ferrocyanide compound which is supported in a large amount, which is secure and stable on the zeolite in its pores and which exhibits a high percent cesium removal from a radioactive liquid waste containing cesium ions and other coexisting metal ions.

Another object of the present invention is to provide a process for treating a radioactive liquid waste containing cesium with the zeolite adsorbent produced according to the above-mentioned process, thereby removing cesium therefrom with a high percent cesium removal.

According to the present invention, zeolite is impregnated with metal ions capable of forming a sparingly water-soluble ferrocyanide in the pores of zeolite through ion exchange adsorption, and then the zeolite is treated with an aqueous solution of soluble ferrocyanide, thereby forming metal ferrocyanide compound of the above-mentioned metal ions on the zeolite in its pores, and then the zeolite is subjected to ageing treatment.

The sparingly water-soluble metal ferrocyanide compound is supported firmly on the zeolite in its pores according to the following procedure.

Metal ferrocyanide compounds capable of adsorbing cesium ions are all sparingly soluble in water, and thus collidal precipitates of a metal ferrocyanide compound is formed on and supported by the zeolite in its pores by reaction of an aqueous solution containing the metal ions, for example, an aqueous solution of sulfate, nitrate or chloride of the metal ions with an aqueous solution containing ferrocyanide ions, for example, an aqueous solution of potassium ferrocyanide, in the pores of zeolite. It is necessary to support a rather large amount of the metal ferrocyanide compound on the zeolite to effectively remove cesium ions from the radioactive liquid waste. Thus, it is necessary to allow the zeolite to adsorb the metal ions up to its saturation point. That is, the zeolite is repeatedly dipped into an aqueous solution containing the salt of the metal ions up to the saturation point, thereby supporting the metal ions on the zeolite in its pores, and then an aqueous solution of potassium ferrocyanide is added to the zeolite to allow the supported metal ions to react with the ferrocyanide ions, thereby forming the metal ferrocyanide compound on the zeolite in its pores. Then, the zeolite is heated to 100° C. in water or in air to promote the crystallization of the metal ferrocyanide compound, or dipped in a highly concentrated aqueous solution of neutral alkali metal salt, for example, sodium sulfate to remove the unreacted metal ions and age the metal ferrocyanide compound in the pores. In the latter case, the ageing can be carried out at room temperature, but it is preferable to carry out the ageing at 80°–100° C.

Then, the zeolite is washed with water to remove the metal ferrocyanide compound formed outside the pores, and dried to about 100° C. Even if dried, the zeolite having a stable and effective cesium adsorbability can be obtained.

As the metal ions capable of forming sparingly water-soluble ferrocyanide, copper, nickel, cobalt, zinc, manganese and iron ions or a mixture thereof can be reagarded as effective. Trivalent iron ions are not suitable owing to its easy release from the zeolite, and divalent iron ions seem to be more suitable. However, the present inventors have found that copper, nickel, cobalt, manganese, and zinc ions, preferably copper and nickel ions, more preferably copper ions, can be used in the present invention, as will be described later. These metal ions can be used as an aqueous solution in the form of sulfate, nitrate, chloride, etc. thereof, for example, copper sulfate nickel chloride, cobalt nitrate, manganese sulfate, and zinc sulfate.

On the other hand, it is preferable to use type X zeolite having a large pore volume and a large exchange capacity, but type Y zeolite can be used in the present invention. In the present invention, it is preferable to use zeolite having a particle size of 60–80 mesh, but the present invention is not particularly limited thereto. That is, zeolite having any other particle size can be used, depending upon the desired purpose.

Adsorption capacity of the metal ferrocyanide-impregnated zeolite thus produced according to the present process depends upon the species of impregnating metal and zeolite, and particularly upon the amount of metal ferrocyanide supported on the zeolite. For example, a type X zeolite adsorbent having a particle size of 60–80 mesh and about 60 milliequivalents of copper ferrocyanide supported per 100 g of the zeolite has a capacity to adsorb about 10 milliequivalents of cesium. Actually, the amount of radioactive cesium formed by nuclear fission is nearly carrier-free in the radioactive liquid waste, and thus the radioactive cesium can be very effectively removed even with the zeolite impregnated with a small amount of metal ferrocyanide. In that case, cesium can be removed from the liquid waste in a range of such an acidity as about 1 M to such an alkalinity as a pH of about 12 without any problem, and without any influence of coexisting sodium ions up to about 20% by weight of sodium ions. Furthermore, the cesium removal is not influenced with the coexisting calcium and manganese ions, or carbonate ions, either.

The zeolite adsorbent produced according to the present process can be used as filled in a column, that is, according to the so called column procedure, and thus the cesium removal efficiency can be greatly enhanced.

The present invention will be described in detail below, referring to Examples and Drawings.

BRIEF DESCRIPTION OF THE DRAWINGS

FIG. 3 is a diagram showing an influence of various species of coexisting ions upon the percent cesium removal of copper ferrocyanide-impregnated zeolite adsorbent.

PREFERRED EMBODIMENTS OF THE INVENTION

Example 1

100 g of type X zeolite having a particle size of 60–80 mesh is throughly wetted with water in a beaker, admixed with 30 ml of an aqueous 0.5 M copper sulfate solution, and gently stirred for a few minutes to effect ion exchange, whereby copper ions are adsorbed on the zeolite. The water phase is thrown away. This operation is repeated 5 times to adsorb as many copper ions as possible on the zeolite. In the initial operation, the copper ions are rapidly adsorbed on the zeolite and accordingly the water phase becomes colorless, but in the successive operations there remain unadsorbed copper ions in the water phase, turning it blue. Thus, the saturation state can be detected from the color state of the water phase. Then, the zeolite impregnated with the adsorbed copper ions is washed with water by decantation, and water washing is repeated until no copper ion is detected in the resulting washing water.

Then, the zeolite is admixed with about 80 ml of an aqueous 0.5 M potassium ferrocyanide solution, occasionally stirred, and left standing for an appropriate period of time, whereby copper ferrocyanide is formed on the zeolite in its pores as well as on its surface, turning the zeolite brown. A portion of copper ferrocyanide is formed apart from the zeolite, turning the water phase reddish brown and turbid. Then, the water phase is thrown away by decantation, and the zeolite is admixed with an aqueous 15 wt.% sodium sulfate solution to release the unreacted copper from the zeolite, and solidify, age and stabilize the copper ferrocyanide formed in the pores. At that time, this can be effectively promoted by heating the aqueous sodium sulfate solution to 80°–100° C. Without such a stabilization operation, it is difficult to prevent the release of copper ferrocyanide from the impregnated zeolite.

Then, the zeolite is washed with water several times, and dried. Even if heated at about 100° C. to dry, the cesium adsorbability of the zeolite adsorbent is never lowered, though the copper ferrocyanide turns somewhat blackish.

Figure 1:
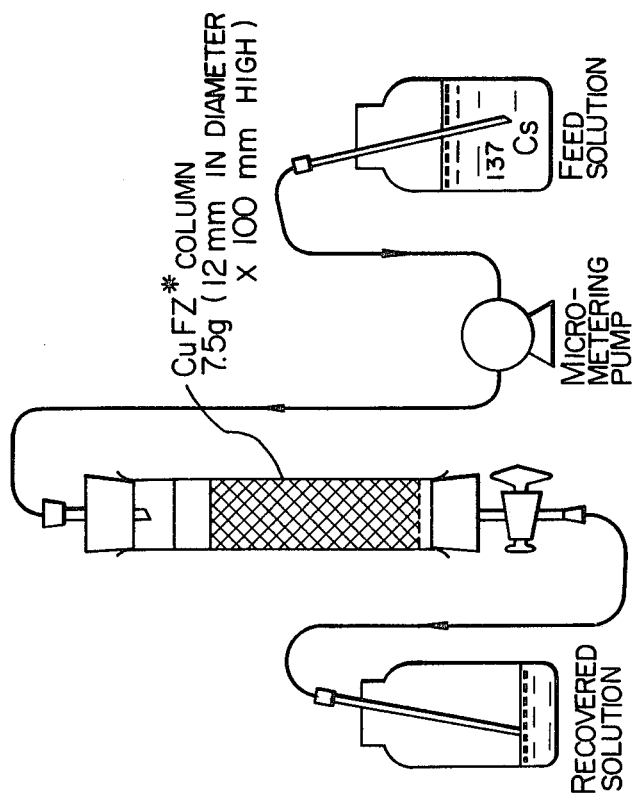
FIG. 1 is a flow diagram showing a test apparatus for measuring decontamination factor and percent cesium removal of metal ferrocyanide-impregnated zeolite adsorbent.

The copper ferrocyanide-impregnated zeolite adsorbent thus produced has about 25 mg of copper per gram of the zeolite, and is filled in a teflon tube having an inner diameter of 12 mm up to a height of 100 mm which corresponds to a net weight of 7.5 g, making a packed column, and tested in the test apparatus as shown in FIG. 1. That is, 1,000 ml of artificially prepared aqueous solutions containing 400 ppm of cesium-137 as a tracer and cesium as carrier and 0 to 20% by weight of $Na_2SO_4$ is passed as a test solution through the column at a constant rate of 4 ml/min by means of a micro-metering pump.

Radioactivities of effluent solution and zeolite adsorbent are measured by 400 channel wave height analyzer connected to sodium iodide (tallium) detector. It is found from the test that the decontamination factor of radioactive cesium:

$$\text{Decontamination factor} = \frac{\text{Radioactivity concentration of effluent solution}}{\text{Radioactivity concentration of incoming solution}}$$

is 100 to 1,000. That is, in the case of a liquid waste having a radioactivity concentration of 0.2 $\mu$Ci/ml, the radioactivity is reduced to $2 \times 10^{-3} – 10^{-4}$ $\mu$Ci/ml after the treatment.

The decontamination factor of 1,000 means that the ceisum in a liquid waste is removed to leave 0.1% of the originally present cesium (percent cesium removal: 99.9%), and the decontamination factor of 100 means that 1% of the original cesium remains after treatment (percent cesium removal: 99%), and the decontamination factor of 100 to 1,000 is regarded as distinguished in removal efficiency. That is, the ion exchanger column in an apparatus for separating and concentrating cesium can be made smaller in size without impairing the desired purpose. Furthermore, the copper ferrocyanide-impregnated zeolite is stable and thus can be used for a prolonged period of time. That is, the maintenance of ion exchanger column can be simplified.

Example 2

As metal ion species capable of forming sparingly water-soluble ferrocyanides which are to be supported on zeolite, manganese, divalent iron, cobalt, nickel, zinc ions, etc. can be regarded as applicable beside the copper ions as in Example 1. Thus, zeolite adsorbents impregnated with ferrocyanides of various metal species are synthesized, and their cesium adsorption capacities are compared. The synthesis is carried out in the same manner as in Example 1 for producing copper ferrocyanide-impregnated zeolite, whereby zeolite adsorbents with 25 mg of the respective metal species supported per gram of the zeolite are prepared.

Figure 2:
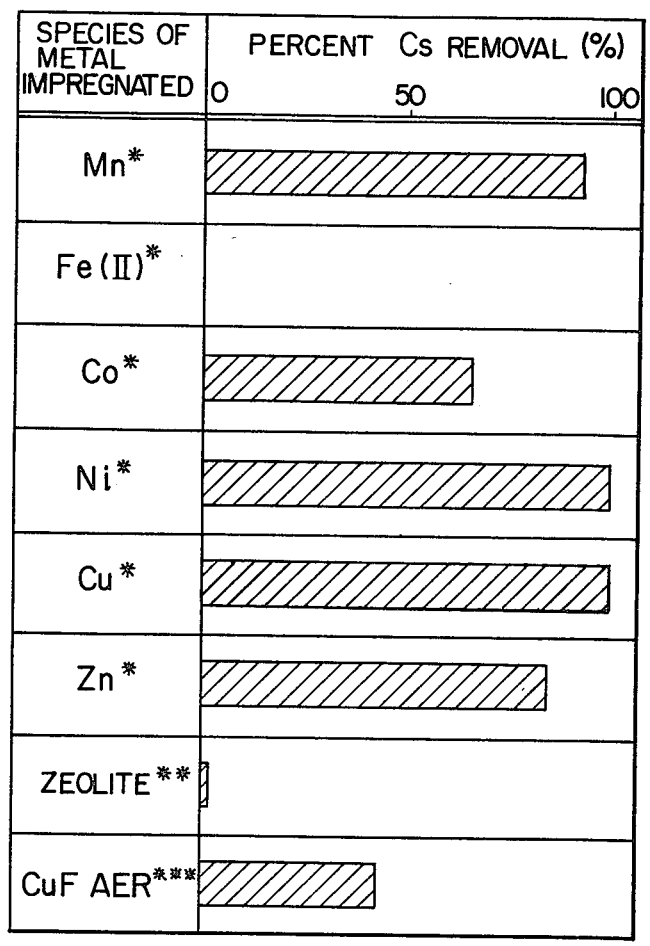
FIG. 2 is a diagram showing percent cesium removal of zeolites impregnated with various metal ferrocyanides, zeolite without impregnating metal ferrocyanide and copper ferrocyanide-impregnated anion exchange resin.

In FIG. 2, percent cesium removal of zeolite adsorbents impregnated with various metal ferrocyanides including the copper ferrocyanide-impregnated zeolite of Example 1 are shown, where the percent cesium removal of zeolite without any impregnating metal ferrocyanide and copper ferrocyanide-impregnated anion exchange resin are also shown.

As is evident from FIG. 2, the percent cesium removal of zeolite adsorbent impregnated with ferrocyanides of copper, nickel, cobalt, manganese, and zinc is distinguished, whereas the zeolite adsorbent impregnated with ferrous ferrocyanide is not suitable owing to the release of the ferrous ferrocyanide from the impregnated zeolite. Among them, the zeolite absorbent impregnated with copper and nickel ferrocyanides are particularly preferable. In view of metal cost, the zeolite adsorbent impregnated with copper ferrocyanide is most preferable.

Example 3

Coexisting ion species include calcium ions and magnesium ions existing in liquid waste as scales or inhibitors, and carbonate ions ($CO_3^{2-}$) existing in liquid waste as a result of carbon dioxide gas absorption from air. Particularly, the carbonate ions are deemed to readily form complex salts. Thus, the present inventors have investigated the influence of these coexisting ion species on the percent cesium removal, using copper ferrocyanide-impregnated zeolite adsorbent (25 mg Cu/g zeolite). Test conditions and results are shown in FIG. 3, where ratio of coexisting metal ions to cesium ions is shown. It is seen from FIG. 3 that there is no influence on the percent cesium removal even if there are calcium, magnesium or carbonate ions in an amount 25 times as much as Cs ions, that is, 1,000 ppm, in the liquid waste.

Furthermore, the influence of ammonium ions upon the percent cesium removal has been investigated, because the liquid waste from a fuel reprocessing plant may contain $NH_4NO_3$. It is seen from FIG. 3 that the percent cesium removal is lowered when there are ammonium ions in an amount 12.9 times as much as the cesium ions, that is, about 500 ppm.

Example 4

Percent Cs removal of copper ferrocyanide-impregnated zeolite adsorbent, known copper ferrocyanide-impregnated anion exchange resin, zeolite without any impregnating metal ferrocyanide, and cation exchange resin without any impregnating metal ferrocyanide has been investigated, using the artificially prepared waste solution of Example 1 while changing the sodium ion concentrations in a range of from 0 to 20% by weight. Results are shown in FIG. 4.

Figure 4:
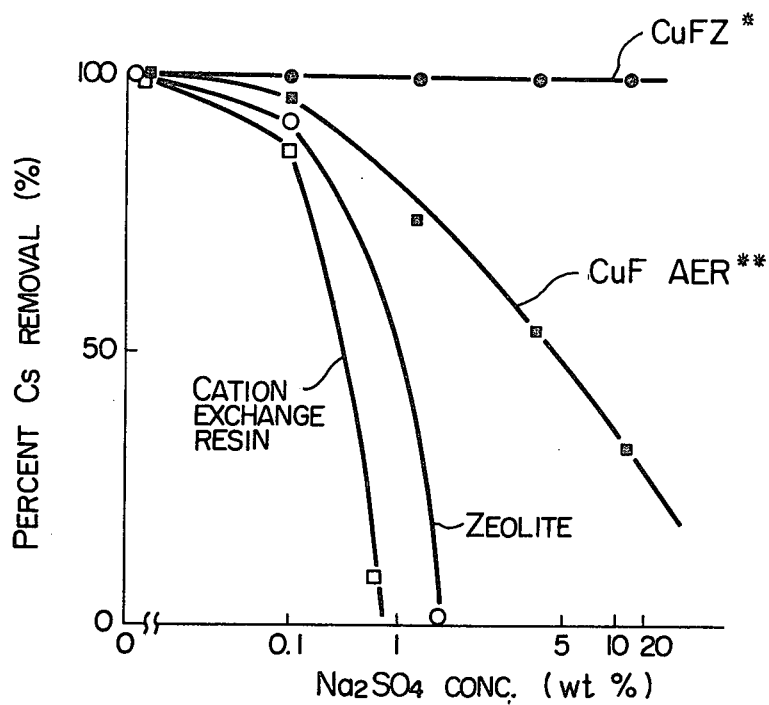
FIG. 4 is a diagram showing an influence of concentrations of coexisting sodium ions upon the percent cesium removal of copper ferrocyanide-impregnated zeolite adsorbent, copper ferrocyanide-impregnated anion exchange resin, zeolite without impregnating metal ferrocyanide, and cation exchange resin without impregnating metal ferrocyanide.

As is evident from FIG. 4, the radioactive cesium can be selectively and efficiently separated and removed even if there is a large amount of sodium ions.

Since the radioactive cesium can be selectively and efficiently separated and removed according to the present invention, reduction in exposure and surface dose rate, etc. can be attained in the liquid waste treatment in a nuclear power plant, etc.

In the foregoing Examples 1 and 2, the ageing treatment is carried out by dipping the zeolite in an aqueous solution of neutral alkali metal salt, but a metal ferrocyanide-impregnated zeolite adsorbents with an equal effect can be obtained by ageing by heating the zeolite in water or air at 100° C.

In the foregoing Examples, type X zeolite is used, but an adsorbent with an equal effect can be also obtained from type Y zeolite.

Figure 5:
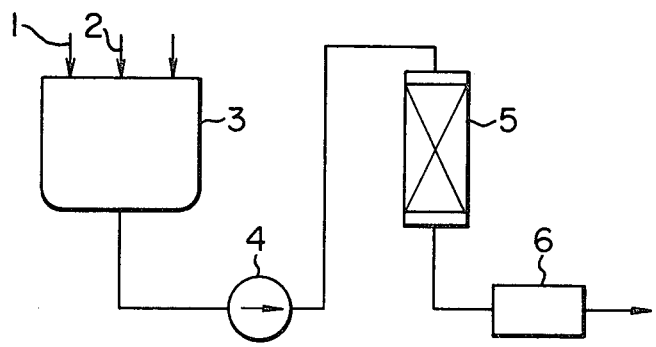
FIG. 5 is a flow diagram showing essential parts of a system for treating a radioactive liquid waste from a nuclear power plant, using the metal ferrocyanide-impregnated zeolite adsorbent produced according to the present invention.

A system for treating a radioactive liquid waste from a nuclear power plant with the metal ferrocyanide-impregnated zeolite adsorbent produced according to the present process is shown in FIG. 5, where a liquid waste from regeneration of condensate demineralizer of nuclear reactor, floor drains, etc. are collected into a liquid waste tank through conduits 1 and 2, and the liquid waste in the liquid waste tank 3 is led to a column 5 filled with, for example, copper ferrocyanide-impregnated zeolite adsorbent. The liquid waste freed from the radioactive cesium is dried and pelletized, for example, by a means 6 for volume reduction and solidification.

What is claimed is:

1. A process for producing a metal ferrocyanide-impregnated zeolite adsorbent, which comprises:
   (1) impregnating zeolite with a salt of a metal capable of forming, sparingly, water-soluble ferrocyanide in the pores of the zeolite through ion exchange adsorption;
   (2) treating the zeolite with a water-soluble ferrocyanide compound, thereby forming a ferrocyanide of the metal; and
   (3) subjecting the zeolite to aging treatment to stabilize said metal ferrocyanide within the pores of said zeolite; said aging treatment being carried out by dipping in a highly concentrated aqueous solution of neutral alkali metal salt at room temperature to 100° C.

2. A process according to claim 1, wherein the salt of metal capable of forming sparingly water-soluble ferrocyanide is used in a form of an aqueous solution, and the zeolite is dipped in the aqueous solution.

3. A process according to claim 2, wherein the salt of metal capable of forming sparingly water-soluble ferrocyanide is a water-soluble salt of at least one of copper, nickel, cobalt, manganese and zinc.

4. A process according to claim 3, wherein the salt of metal capable of forming sparingly water-soluble ferrocyanide is salt of copper or nickel.

5. A process according to claim 1, wherein the ageing treatment is carried out in water or in air at 100° C.

6. A process according to claim 5, wherein the neutral alkali metal salt is sodium sulfate.

7. A process according to claim 1, wherein the water-soluble ferrocyanide is potassium ferrocyanide.

8. A process according to claim 3, wherein the salt is a nitrate, sulfate or chloride salt.

* * * * *